United States Patent [19]

Harasawa et al.

[11] Patent Number: 5,771,630
[45] Date of Patent: Jun. 30, 1998

[54] AGRICULTURAL COVERING MATERIAL

[75] Inventors: Isamu Harasawa, Higashikurume; Yoshiaki Ishisaki, Ikeda; Yasuaki Oonishi, Uozu, all of Japan

[73] Assignee: Nippon Carbide Kogyo Kabushiki Kaisha, Tokyo, Japan

[21] Appl. No.: 696,818

[22] PCT Filed: Feb. 21, 1994

[86] PCT No.: PCT/JP94/00258

§ 371 Date: Aug. 20, 1996

§ 102(e) Date: Aug. 20, 1996

[87] PCT Pub. No.: WO95/22244

PCT Pub. Date: Aug. 24, 1995

[51] Int. Cl.[6] .................................................. A01G 9/14
[52] U.S. Cl. .................................................. 47/26; 47/17
[58] Field of Search .................................. 47/17, DIG. 6, 47/26, 58, 9, 1.01; 549/287; 524/110, 84, 89, 92, 94, 159, 162; 428/330, 421, 422

[56] References Cited

U.S. PATENT DOCUMENTS

| 3,857,804 | 12/1974 | Glahi et al. | 47/58 X |
| 3,911,620 | 10/1975 | Glahi | 47/17 X |
| 4,266,370 | 5/1981 | Kodera et al. | 47/17 X |
| 4,965,302 | 10/1990 | Hirahara et al. | 524/83 |
| 5,482,986 | 1/1996 | Ogiso et al. | 524/110 |

Primary Examiner—Michael J. Carone
Assistant Examiner—Robert Pezzuto
Attorney, Agent, or Firm—Sherman and Shalloway

[57] ABSTRACT

The present invention provides an agricultural covering material comprising a fluororesin film which intercepts the transmission of the ultraviolet rays having a wavelength range of at least 300–330 nm, by at least 40% and which transmits at least 70% of the visible rays having a wavelength range of 400–800 nm.

The covering material can be used outdoors in a spread state over a long period of time and is useful as a covering material for greenhouse to replace glass, for cultivation of various useful crops.

14 Claims, 1 Drawing Sheet

AGRICULTURAL COVERING MATERIAL

TECHNICAL FIELD

The present invention relates to an agricultural covering material, particularly to an agricultural covering material which partially intercepts the rays of particular wavelength ranges and which can be used in a spread state over a long period of time.

BACKGROUND ART

There have been used, as covering materials for plastic tunnel or pipe house, a polyethylene film, an ethylene-vinyl acetate copolymer film, a polyester film, a vinyl chloride resin film, etc. A vinyl chloride resin film occupies a major portion because of the applicability, price, heat-insulatability, etc. Since these resins have inferior outdoor durability, they are used for 1–2 years and farmers replace the covering materials every 1–2 years.

Full-scale large houses have been used in recent years for the purposes of labor saving for house management, enlargement of cultivation area, cultivation of higher quality crops, prolongation of house life, etc. In these large houses are used, as covering materials durable for about 5 years, such covering materials as polyester resin panel, polycarbonate resin panel, hard vinyl chloride resin panel, acrylic resin panel, fiber-reinforced plastic panel and the like. Since these covering materials have a large thickness, they have drawbacks in that they must use a specially made large base material and be spread, making the application very complicated and moreover they are relatively expensive. A polyester resin panel, a polycarbonate resin panel, a hard vinyl chloride resin panel, an acrylic resin panel, etc. have further problems in that they tend to generate cracks when hit by hail, etc. and the cracks tend to propagate.

Also, flat glass is used as a durable covering material which can be used for 10 years or more. Flat glass, however, has problems in that it is expensive and, moreover, it is broken easily and, once broken, the soil inside house must be replaced to remove the fine pieces of broken glass.

In order to solve these problems, Japanese Patent Application Kokai (Laid-Open) No. 43535/1989, for example, proposes an agricultural covering material comprising a fluororesin film.

While the above-mentioned conventional agricultural covering materials contain a small amount of an ultraviolet absorber for improvement of the weatherability and generally have a property of intercepting the ultraviolet rays of sunlight to some extent, a fluororesin film has excellent weatherability by itself and accordingly requires no use of any weatherability improver (e.g. ultraviolet absorber) therein. Consequently, an agricultural covering material comprising a fluororesin film transmits even the ultraviolet rays of sunlight. Therefore, when the crop for in-house cultivation which had been subjected to breeding so as to fit the cultivation in a house covered with a conventional agricultural covering material capable of intercepting ultraviolet rays to some extent, was cultivated in a house covered with a fluororesin film, there have arisen new problems not experienced with conventional agricultural covering materials, such as delay of growth or harvesting time, reduction in quality of harvest owing to, for example, the hardening of stem and leaf or of fruit, flower color darkening or discoloration of flowers and ornamental plants, and the like.

Fluororesin films are superior in mechanical strengths, transparency, weatherability, etc. and are best suited as a base material for use in an agricultural covering material which can be used in a spread state over a long period of time, for example, 10 years or more. Hence, the present inventors made a study in order to solve the above-mentioned problems possessed by an agricultural covering material comprising a fluororesin film.

It is thought, as one mean for solving the problems, to use an ultraviolet absorber in a fluororesin film as in the case of conventional agricultural covering materials. However, fluororesins have a high melt-processing temperature and it is practically difficult to use therein an organic ultraviolet absorber such as used in conventional agricultural covering materials.

The present inventors have developed a fluororesin film which can be used even for the conventional crops for in-house cultivation without inviting the above-mentioned problems, by using, in a fluororesin, an inorganic fine powder capable of withstanding the melt-processing temperature of fluororesin.

DISCLOSURE OF THE INVENTION

According to the present invention there is provided an agricultural covering material comprising a fluororesin film which intercepts the transmission of the ultraviolet rays having a wavelength range of at least 300–330 nm, by at least 40% and which transmits at least 70% of the visible rays having a wavelength range of 400–800 nm.

The fluororesin film used as the agricultural covering material of the present invention intercepts the transmission of the portion of the ultraviolet rays of sunlight, having a wavelength range of at least 300–330 nm, by at least 40%, preferably 60% or more, more preferably 80% or more, most preferably 90% or more. The fluororesin film is not necessarily required to intercept the transmission of the ultraviolet rays having a wavelength longer than 330 nm, but it is desirable that the fluororesin film intercepts as well the transmission of the ultraviolet rays having a wavelength range of about 350 nm or shorter by at least 40%, preferably 50% or more.

Meanwhile, the visible rays having a wavelength range of 400–800 nm, which are necessary for the growth of crops, are desired to be transmitted through the fluororesin film as much as possible. The transmittance of the visible rays through the fluororesin film is at least 70%, preferably 80% or more, more preferably 85% or more, most preferably 88% or more. Herein, "the transmittance of the visible rays having a wavelength range of 400–800 nm" is an average transmittance of the visible rays in said wavelength range.

The fluororesin film having light transmission properties such as mentioned above can be produced, for example, by compounding, into a fluororesin film, an inorganic powder capable of intercepting the transmission of the ultraviolet rays having a wavelength range of at least 300–330 nm, or by forming, on at least one side of a fluororesin film, a coating layer containing the above inorganic powder.

The fluororesin used as a base material in production of the above film is a (co)polymer obtained from a fluorine-containing monomer(s). Specific examples thereof include a polytetrafluoroethylene (PTFE), a tetrafluoroethylene-perfluoroalkylvinyl ether copolymer (PFA), a tetrafluoroethylene-hexafluoropropylene copolymer (FEP), a tetrafluoroethylene-hexafluoropropylene-perfluoroalkylvinyl ether copolymer (EPE), a tetrafluoroethylene-ethylene copolymer (ETFE), a polychlorotrifluoroethylene (PCTFE), a chlorotrifluoro-ethylene-ethylene copolymer (ECTFE), a polyvinylidene fluoride (PVDF), a polyvinyl fluoride (PVF), and a mixture of at least two of them. Of these, ETFE, PCTFE, ECTFE, PVDF and PVF are preferred; ETFE, PVDF and PVF are more preferred; and ETFE is used particularly preferably.

ETFE is a copolymer of ethylene, tetrafluoroethylene (these two components are major components and the molar ratio of ethylene/tetrafluoroethylene is generally 40/60 to 60/40) and, as necessary, a small amount (generally 10 mole % or less) of a third comonomer component. In the present invention, there is particularly preferred an ethylene-tetrafluoroethylene type copolymer wherein the molar ratio of ethylene/tetrafluoroethylene is in the range of 40/60 to 60/40, preferably 45/55 to 55/45 and wherein the content of a perfluoroalkylvinyl monomer unit represented by a formula $CH_2=CH-C_nF_{2n+1}$ is an integer of 2–10) (for example, a unit derived from $CH_2=CH-C_4H_9$ or $CH_2=CH-C_6H_{13}$) is in the range of 0.1–10 mole %, preferably 0.3–5 mole %. This ethylene-tetrafluoroethylene type copolymer is known per se; and it can be produced by, for example, a process described in Japanese Patent Publication No. 50163/1984, or it is commercially available under the brand name of "AFLON COP" (a product of Asahi Glass Co., Ltd.).

Meanwhile, the inorganic fine powder which can be compounded into the fluororesin, can be appropriately selected from oxides, compound oxides, sulfides, carbonates, etc. of metals such as titanium, zirconium, magnesium, calcium, barium, lanthanum, zinc, aluminum, tin, antimony, etc. Specific examples thereof include titanium oxide ($TiO_2$), zinc oxide (ZnO), mica, alumina ($Al_2O_3$), colloidal silica ($SiO_2$), iron oxide ($Fe_2O_3$), cerium oxide ($CeO_2$), barium oxide (BaO), antimony oxide ($Sb_2O_3$), nickel oxide (NiO), chromium oxide ($Cr_2O_3$), zirconium oxide ($ZrO_2$), calcium oxide (CaO), tin oxide ($SnO_2$) and mixtures thereof. Of these, $TiO_2$, ZnO, $CeO_2$ and $Fe_2O_3$ are preferred, and $TiO_2$ and ZnO are particularly preferred.

The particle diameters of the inorganic fine powder are not particularly restricted as long as the fluororesin film can be endowed with the above-mentioned optical properties. However, the average particle diameter of the inorganic fine powder is generally 1,000 nm or less, preferably 500 nm or less, more preferably 100 nm or less, particularly preferably 50 nm or less.

The amount of the inorganic fine powder used in the fluororesin film varies depending upon the kind of the resin used and the thickness of the film used, but can be in the range of generally 0.01–10% by weight, preferably 0.1–5% by weight, more preferably 0.3–1% by weight.

The molding of a film from the fluororesin containing the inorganic fine powder can be conducted by a per se known method, for example, extrusion or inflation. The thickness of the film obtained can be generally 10–1,000 μm, preferably 30–200 μm, particularly preferably 50–100 μm.

The fluororesin film having the above-mentioned light transmission properties can be produced also by coating, on the surface of a separately produced fluororesin film having a thickness such as mentioned above, a coating fluid comprising an inorganic fine powder such as mentioned above and a resin binder.

In this case, it is desirable that the surface of the fluororesin film is beforehand subjected to a surface-activating treatment in order to enable the uniform coating of the coating fluid on the surface of the fluororesin film, the tight adhesion of the formed coating layer to the film surface, and so forth.

The surface-activating treatment includes a corona discharge treatment, a sputtering etching treatment, a sodium treatment, a sandblasting treatment, etc.

In the corona discharge treatment, discharge is allowed to take place between a knife edge electrode and an opposing electrode with a sample film placed between the electrodes; as a result, oxygen-containing functional groups such as aldehyde, acid, alcohol peroxide, ketone, ether and the like are formed on the film surface.

In the sodium treatment, the fluororesin film is immersed in a liquid ammonia solution containing an alkali metal such as metallic sodium or the like, whereby the $CF_2$ bond is allowed to disappear from the film surface and CH and C—O bonds are formed thereon.

In the sputtering etching treatment, a film sample is placed between electrodes which are conducting glow discharge at a low pressure, to allow the positive ions generated by the glow discharge to hit the film to form a large number of fine projections on the film.

In the sandblasting treatment, a sand of fine particles is blown against a film to form a large number of fine roughnesses on the film surface.

Of these surface-activating treatments, the corona discharge treatment is preferred in view of the adhesivity to the coating layer formed, the workability, the safety, the cost, etc.

The resin binder usable in the coating fluid includes, for example, an acrylic resin, a vinyl acetate resin, a fluororesin and mixtures thereof. It is possible to optionally use, in combination with the resin binder, a hydrophilic polymer, for example, a polyvinyl alcohol, a polyvinylpyrrolidone or a polymer generally having a hydrophilic functional group such as $-SO_4$, $-SO_3H$, $-COOH$, $-CN$, $-(OCH_2CH_2)$ or the like.

The coating fluid may further contain, as necessary, a surfactant such as sorbitan-fatty acid ester, sorbitol-fatty acid ester, diglycerine-fatty acid ester, glycerine-fatty acid ester, sorbitan-fatty acid-dibasic acid ester, sorbitol-fatty acid-dibasic acid ester, diglycerine-fatty acid-dibasic acid ester, glycerine-fatty acid-dibasic acid ester and addition compound obtained by adding an alkylene oxide (e.g. ethylene oxide or propylene oxide) to any of the above esters.

The above-mentioned components are dissolved or dispersed in, for example, water or a solvent of alcohol, ketone, ester or ether type to prepare a coating fluid, and the coating fluid is coated on the fluororesin film. The coating can be conducted by an ordinary method such as brush coating, dip coating, gravure coating, spray coating or the like.

In the coating fluid, the concentration of the inorganic fine powder varies depending upon the thickness of the coating fluid coated, the kind of the resin binder used, etc. However, the content of the inorganic fine powder in the coating layer formed is desirably in the range of generally 0.5–95% by weight, preferably 1–50% by weight, more preferably 3–30% by weight.

The thickness of the coating layer formed is not strictly restricted as long as the resulting film has the above-mentioned light transmission properties, but can be in the range of generally 1–100 μm, preferably 2–50 μm, more preferably 5–20 μm.

The fluororesin film, which can be produced as mentioned above and which has the above-mentioned light transmission properties, shows substantially no change in properties even when used outdoors as an agricultural covering material in a spread state over a long period of time such as 10 years or more, and can be applied to various crops which have been subjected to breeding for in-house cultivation, without causing the above-mentioned problems. Therefore, the fluororesin film can be widely used as a covering material for green house, to replace glass.

According to the present invention, there is also provided a method for cultivation of useful crops, which comprises cultivating useful crops in a greenhouse covered with an agricultural covering material comprising the above-mentioned fluororesin film.

Herein, "useful crops" include agriculture, horticulture and forestry crops useful in human life, and are exemplified by the followings.

[1] Agriculture and horticulture crops
(1) Food crops
Rice, wheat, corn, soybean, sweet potato, potato
(2) Garden crops
Fruit trees
  Apple, pear, persimmon, peach, Japanese apricot, grape, loquat, fig, blueberry, pomegranate, lemon, oranges, etc.
Fruit vegetables
  Cucumber, watermelon, tomato, strawberry, pumpkin, melon, eggplant, pea, okura, pimento
Root vegetables
  Carrot, burdock, taro, ginger, lotus root, wasabi (Japanese horseradish), arrow head, scallion
Leaf vegetables
  Chinese cabbage, white stemmed onion, garlic, onion, cabbage, Japanese parsley, spinach, beefsteak plant, Japanese butterbur, celery, gynmight, parsley, trefoil, asparagus, udo salad plant
Flowers (annual and biennial)
  Morning glory, cosmos, Iceland poppy aster, yellow sultan, snapdragon, calendura, stock, pansy, sunflower, benidium, dimolphoseca, safflower, white lace flower, cornflower, prairie gentian, lodans
Perenial plants
  Lawn grasses, oriental orchid, gypsophila, carnation, gerbera, bellflower, chrysanthemum, rabbit-ear-iris, statice, peony, marguerite
Bulbous plants
  Lilies, gladiolus, iris, anemone, calla, daffodil, freesia, ranunculus, blackberry lily
Flowering trees and shrubs
  Acasia, azalea, rose, mewsyran, lagerstroemia, winter daphne, chloranthus glaber MAKINO, cyad (Japanese sago palm), camellia, tea oil plant, encalyptus
Greenhouse plants
  Orchid, cyclamen
(3) Industrial crops
Oil crops
  Rapeseed, sesame
Sugar crops
  Sugar cane, sugar beet
Fiber crops
  Cotton, hemp, flax, jute
Starch crops
  Konjac
Medical herbs
  Japanese peppermint, poppy
Recreation crops
  Tea, tobacco, hop
Paper-making crops
  Paper mulberry, mitsumata
Dye crops
  Japanese indigo plant
Flavoring crops
  Geranium
Sap crops
  Lacquer tree
(4) Forage crops
Forage crops
  Orchard grass, red clover, white clover
Plants for feed and manure
  Bread tree, silk tree
Green manure crops
  Chinese milk vetch, bur clover
[2] Forestry trees
  Coniferous trees
    Japanese cedar, Japanese cypress, pine tree
  Broad leaved evergreens
    Aucuba, fatsia
  Broad leaved deciduous trees
    Nara oak, Siebold's beech Of these crops, those to which the agricultural covering material of the present invention is applicable particularly favorably, are garden crops; preferably fruit vegetables, root vegetables, leaf vegetables, flowers, perennial plants, flowering trees and shrubs, and greenhouse plants; more preferably fruit vegetables, flowers, perennial plants, and flowering tress and shrubs; most preferably fruit vegetables, and flowering trees and shrubs.

The fruit vegetables to which the present agricultural covering material is applicable favorably, include cucumber, watermelon, tomato, strawberry, melon and pimento, with cucumber, melon and tomato being particularly preferred; the root vegetables are preferably carrot and ginger; and the leaf vegetables are preferably Chinese cabbage, white stemmed onion, celery and trefoil.

The flowers to which the present agricultural covering material is applicable favorably, include stock and prairie gentian; the perennial plants include oriental orchid, gypsophila, carnation, gerbera, chrysanthemum and statice with carnation, gerbera and chrysanthemum being particularly preferred; the bulbous plants are preferably lilies and iris; and the flowering trees and shrubs are preferably rose.

By cultivating these useful crops in a green-house covered with the agricultural covering material of the present invention, there can be obtained various cultivation effects which have not been obtainable with conventional agricultural covering materials, as shown in Examples described later. The effects are summarized as follows.

(1) When the agricultural covering material of the present invention is used, as compared with when conventional covering materials are used, cultivation is very easy. Therefore, farmers do not fail in cultivation and can obtain a stable yield.

(2) When the agricultural covering material of the present invention is used, as compared with when conventional covering materials are used, a harvest of good quality can be obtained in a large amount, and a high profit is promised.

Examples

The present invention is hereinafter described more specifically by way of Examples.

Examples of production of films
Production Example A (a comparative example)

Into an autoclave having an internal volume of 10 liters were fed 3.46 kg of trichloromonofluoromethane, 6.52 kg of trichlorotrifluoroethane and 2.38 g of t-butyl peroxyisobutyrate. Thereto were fed 1,226 g of tetrafluoroethylene, 82 g of ethylene and 26 g of perfluorobutylethylene ($CH_2=CH-C_4F_9$). The resulting mixture was subjected to a copolymerization reaction with sufficient stirring with the reaction temperature being kept at 65° C.

During the copolymerization reaction, the polymerization pressure was kept at 15.0 kg/cm$^2$ by introducing into the system a tetrafluoroethylene/ethylene/perfluorobutylethylene (molar ratio: 53/46.3/0.7) mixed gas. After 5 hours, 460 g of a white copolymer (hereinafter referred to as resin No. 1) was obtained. The copolymer had a $C_2F_4/C_2H_4/CH_2=CHC_4F_9$ molar ratio of 53/46.3/0.7, a flow-starting temperature of 267° C. and a pyrolysis-starting temperature of 360° C.

The above-obtained ethylene-tetrafluoroethylene type copolymer (hereinafter abbreviated to "ETFE" in some cases) was extruded at a resin temperature of 320° C. to produce a film No. 1 having a thickness of 60 μm.

Production Example B (a comparative example)

There were mixed 67 parts by weight of a polyvinyl chloride (polymerization degree: 1,300), 25 parts by weight of dioctyl phthalate (a plasticizer), 5 parts by weight of tricresyl phosphate (a plasticizer), 3 parts by weight of an epoxidized soybean oil (a plasticizer), 0.8 part by weight of barium licinolate (a stabilizer), 0.5 part by weight of zinc stearate (a stabilizer), 0.3 part by weight of dibutyltin maleate (a stabilizer), 0.6 part by weight of sorbitan monopalmitate (a surfactant) and 5 parts by weight of 2-hydroxy-4'-methoxybenzophenone (an ultraviolet absorber). The resulting mixture was melt-extruded at 200° C. by the use of an extruder to obtain a film No. 4 having a thickness of 60 μm.

Production Example C (present invention)

A film No. 2 having a thickness of 60 μm was obtained in the same manner as in Production Example A except that 0.2% by weight of zinc oxide (ZnO) having an average particle diameter of 20 nm was added to the EFTE obtained in Production Example A.

Production Example D (present invention)

One side of the film No. 1 obtained in Production Example A was subjected to a corona discharge treatment under the conditions of discharge current=10A, discharge voltage=120 V and line speed=13 m/min. Separately, 5% by weight of a polyvinyl alcohol and 5% by weight of $TiO_2$ having an average particle diameter of 30 nm were added to a silica sol (solid silica content=8%), and the mixture was diluted 100-fold with ethanol to prepare a coating fluid. The coating fluid was coated on the above-treated side of the film No. 1 in an amount of 15 g/m$^2$ to obtain a film No. 3.

Evaluations of film properties

1. Transparency

Figure 1:
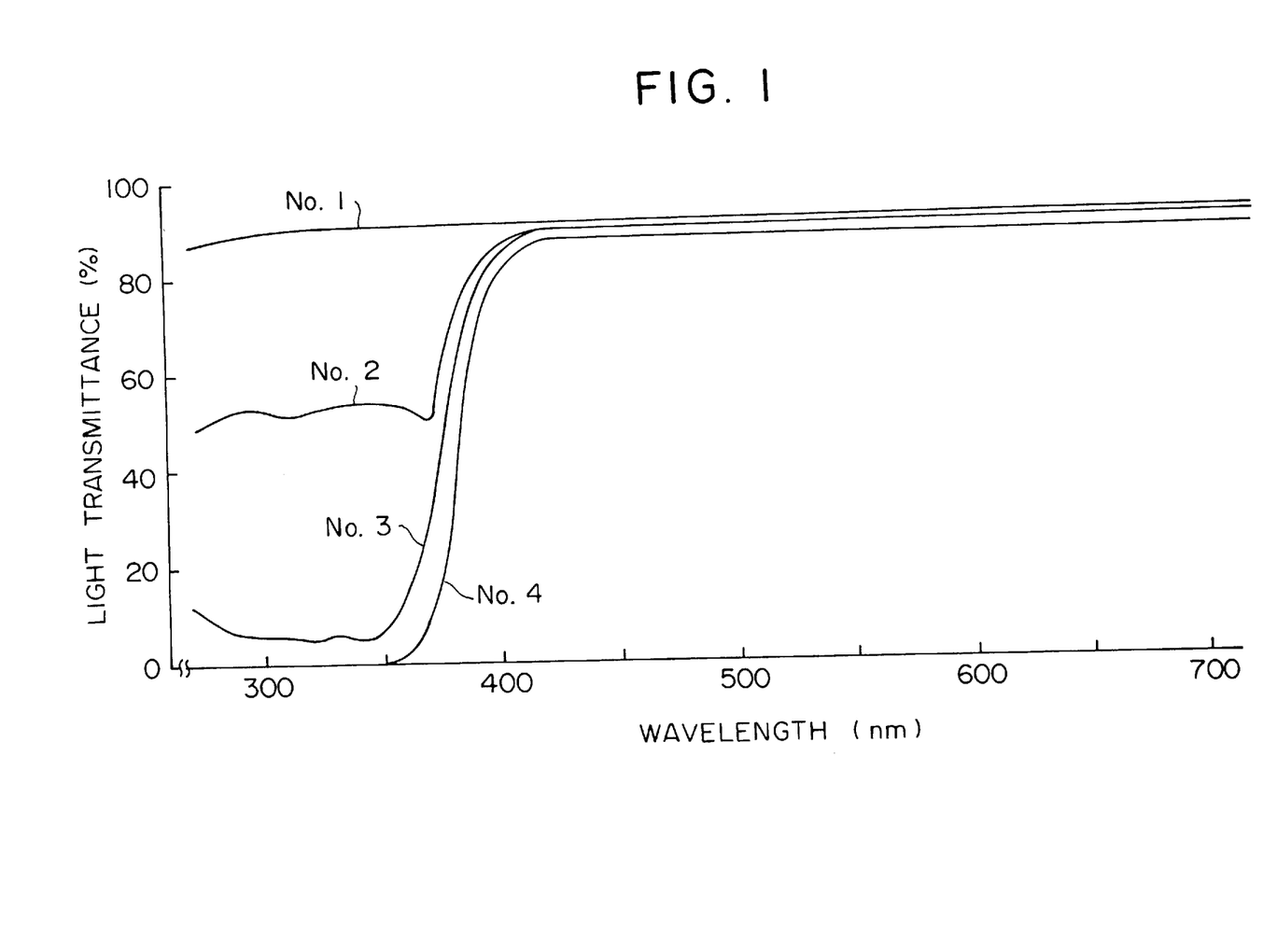
FIG. 1 shows the curves of light transmittances at various wavelengths, of the film Nos. 1–4 obtained in the above Production Examples A–D.

There were prepared, as conventional agricultural covering materials, a soft vinyl chloride resin film [Noubi Ace (trade name), a product of Mitsubishi Chemical MKV Co., 100 μm], a poly ester film [SIKUSURAITO (trade name), a product of Taiyo Kogyo Co., Ltd., 175 μm], a polycarbonate resin panel [Iupilon (trade name), a product of Mitsubishi Gas Chemical Co., Inc., 1,000 μm] and an acrylic resin panel [Acryl Panel (phonetical translation) (trade name), a product of Mitsubishi Rayon Co., Ltd., 1,700 μm]. These conventional covering materials and the film Nos. 1–4 obtained in the above Production Examples were fixed on an outdoor exposure stand having an inclination of 45° and looking toward the south, located at Uozu City, Toyama Prefecture, Japan.

After 4 years of outdoor exposure, all the agricultural covering materials were recovered and measured for average light transmittance of visible rays having a wavelength range of 400–800 nm, by the use of a spectrophotometer. The results are shown in Table 1.

TABLE 1

| | | Light transmittance (%) | |
|---|---|---|---|
| Agricultural covering material | Thickness (μm) | Before exposure | After exposure |
| Film No. 2 | 60 | 91 | 85 |
| Film No. 3 | 62 | 93 | 87 |
| Film No. 1 | 60 | 93 | 87 |
| Film No. 4 | 60 | 88 | 15 |
| Soft vinyl chloride resin film | 100 | 87 | 21 |
| Polyester film | 175 | 90 | 50 |
| Polycarbonate resin panel | 1,000 | 88 | 48 |
| Acrylic resin panel | 1,700 | 94 | 45 |

As is clear from Table 1, each of the soft vinyl chloride resin film, the polyester film, the polycarbonate resin panel, the acrylic resin panel (these are conventional covering materials), and the film No. 4 containing a large amount of an ultraviolet absorber gave 50% or less of a light transmittance after 4 years of outdoor exposure and became unusable as an agricultural covering material.

In contrast, the film Nos. 1–3 each comprising a fluororesin showed substantially no reduction in tansparency after outdoor exposure and kept substantially the same transparency a s before exposure.

2. Impact resistance

In order to evaluate the impact resistance of a sample film when hit by the wood pieces carried by a typhoon, a small stone having a weight of 300 g was dropped, from a height of 50 cm, on each of the film Nos. 2–3 and also on a flat glass (a product of Asahi Glass Co., Ltd., thickness: 3 mm) to examine the extent of the damage.

As a result, the flat glass was broken into fine pieces while the film Nos. 2–3 were not broken and had no damage.

From the above, it is presumed that a flat glass is easily broken by, for example, hail or the objects carried by typhoon and consequently the useful crops cultivated in a greenhouse covered with a flat glass receive deadly damage.

It was found out from the above tests that, of conventional agricultural covering materials, those satisfactory in transparency and impact resistance are only fluororesin films.

Examples of cultivation of useful crops

[1] Evaluation of cultivation of tomato

Each of the film Nos. 1–4 obtained in Examples of production of films was spread on a house (width: 10 m, depth: 20 m).

(1) Cultivation-1

Tomato seeds (variety: momotaro) were sown on August 25 to raise seedlings. On October 2, young seedlings in uniform growth in which 2–3 first clusters were in bloom, were set in each house so as to give an intrarow spacing of 50 cm.

The amounts of applied fertilizers are shown in Table 2. For about 10 days after setting, watering was made in a relatively small amount in such an extent that the young seedlings showed no wilting and made no rapid growth. The temperature of cultivation was controlled at 28° C. in the morning, at 25° C. in the afternoon and at 5° C. or higher during the night. Therefore, hot-air heating was conducted with a heater during low-temperature seasons.

TABLE 2

| Name of fertilizer | Amount of fertilizer applied (Kg/10 a) | Fertilizer components (Kg/10 a) | | | Remarks |
|---|---|---|---|---|---|
| | | N | P | K | |
| Compound fertilizer for exclusive use in tomato | 200 | 16 | — | — | Initial manure |
| Magnesium-containing calcined phosphate | 30 | — | 10.5 | — | Initial manure |
| Fused phosphate fertilizer | 40 | — | 8 | — | Initial manure |
| Potassium sulfate | 30 | — | — | 15 | Initial manure |
| Sumika Ace | 150 | 22.5 | 15 | 21 | Additional manure |
| E No.2 (liquid fertilizer) | 75 | 6 | 3 | 4.5 | Additional manure |

Harvesting was conducted from December 10 through May 30, next year. The results of yield and other inspections are shown in Table 3.

The inspection items and the evaluation methods therefor are shown below.

Yield: an index when the total weight of the harvest obtained in the house covered with the film No. 4 was taken as 100.

The same calculation was made also in other cultivation examples.

TABLE 3

| | Cultivation Example 1 | Cultivation Example 2 | Comparative Cultivation Example 1 | Comparative Cultivation Example 2 | Remarks |
|---|---|---|---|---|---|
| No. of spread film | 2 | 3 | 1 | 4 | |
| 1. Yield | 121 | 135 | 108 | 100 | |
| 2. Quality | | | | | |
| (1) Hardness of exodermis | Adequate | Adequate | Hard | Soft | |
| (2) Color of exodermis | Pink | Bright pink | Dark red | Light pink | |
| (3) Color of fruit inside | Pink | Pink | Orange with remaining dark green | Light pink | Jelly portion |
| 3. Outbreak of diseases | | | | | |
| (1) Frequency of outbreak | Low | Low | Low | High | Gray mold |
| (2) Infectivity of diseases | Weak | Weak | Strong | Weak | |
| 4. Vermination of injurious insects | Small amount | None | Large amount | None | Greenhouse whitefly |

In the house covered with the film No. 1, the growth of tomato was slow; the stem and leaf and the fruit were hard; and the plant was small as a whole. Consequently, the timing of harvesting was later than in the houses covered with other films. Moreover, the balance between the color of the exodermis of fruit and the color of jelly portion inside fruit was not normal, and the color inside fruit was still green (unripe) but the color of exodermis was already ripe.

In the house covered with the film No. 4, the house inside became highly humid and the growth of the plant was too active, resulting in low yield. Moreover, the plant was soft as a whole and the colors of stem and leaf and fruit were light; this is presumed to be the reason for the high frequency of the outbreak of diseases.

(2) Cultivation-2

The cultivation management for next year was changed as follows based on the results of Cultivation-1, and cultivation (Cultivation-2) was conducted.

In the houses covered with the film Nos. 2–3, the same cultivation conditions as in Cultivation-1 were used.

In the house covered with the film No. 1, the amount of each fertilizer applied was increased by 10%; the total amount of water applied was increased by 10–15%; the night temperature was kept higher by 1° C.; whenever direct sunlight was intense, a black cheese cloth capable of intercepting the light by 50% was spread at the ceiling.

In the house covered with the film No. 4, the amount of each fertilizer applied was decreased by 15%; the amount of water applied was decreased by about 20%; the night temperature was set lower by 1° C.; and leaf picking was as necessary made so that the plant could receive sunlight as much as possible.

Thus, in the houses covered with the film No. 1 and 4, the time spent by farmer for operation was about 1.5–2 times those spent in the cases of the film Nos. 2–3. Particularly in the house covered with the film No. 1, the intensity of sunlight had to be checked as necessary, which disturbed other agricultural works. The results of cultivation are shown in Table 4.

TABLE 4

| | Cultivation Example 3 | Cultivation Example 4 | Comparative Cultivation Example 3 | Comparative Cultivation Example 4 |
|---|---|---|---|---|
| No. of spread film | 2 | 3 | 1 | 4 |
| 1. Yield | 104 | 120 | 102 | 100 |
| 2. Quality | | | | |
| (1) Hardness of exodermis | Adequate | Adequate | Slightly hard | Slightly soft |
| (2) Color of exodermis | Pink | Bright pink | Red | Light pink |
| (3) Color of fruit inside | Pink | Pink | Dark red | Light pink |

As is clear from Table 4, in each of the houses covered with the film Nos. 1 and 4, the yield increased over the previous year and was about equal to that when the film No. 2 was used, but was lower than that when the film No. 3 was used. The plant qualities when the film No. 1 and 4 were used, were inferior to those when the film Nos. 2 and 3 were used.

As seen from the above results of 2-year cultivation, when the film Nos. 2–3 were used, cultivation of tomato was very easy as compared with when the conventional film Nos. 1 and 4 were used; there was no failure in cultivation; and a stable yield could be obtained.

Further, the harvested tomato had excellent quality, giving a very high profit.

[2] Example of cultivation of cucumber

Cucumber seeds (variety: Sharp One) were sown on September 15 to raise seedlings. The seedlings were grafted to a stock (variety: King Tosa) on September 22. The grafted seedlings were raised so as to give uniform growth. On October 19, the young seedlings having 3.5 true leaves were set in each of the houses (width: 10 m, depth: 20 m) covered with the film Nos. 1–4, in a density of 4.8 plants/tsubo (3.3 m$^2$).

The amount of each fertilizer applied is shown in Table 5. Until the number of nodes became 13–15, watering was kept as low as possible and the in-house temperature was controlled not to reach 25° C. or higher. Thereafter, care was taken in order for the in-house minimum temperature not to become 11° C. or lower.

TABLE 5

| Name of fertilizer | Amount of fertilizer applied (kg/10 a) | Remarks |
| --- | --- | --- |
| Compound fertilizer for cucumber | 600 | Initial manure |
| Fermented chicken droppings | 600 | Initial manure |
| Magnesium lime | 80 | Initial manure |
| Rice straw compost | 2,000 | Initial manure |
| E No. 2 (liquid fertilizer) | 100 | Additional manure |
| OKF-2 | 100 | Additional manure |

Harvesting was conducted from November 20 through May 10, next year. The results of cultivation are shown in Table 6.

TABLE 6

| | Cultivation Example 5 | Cultivation Example 6 | Comparative Cultivation Example 5 | Comparative Cultivation Example 6 | Remarks |
| --- | --- | --- | --- | --- | --- |
| No. of spread film | 2 | 3 | 1 | 4 | |
| 1. Yield | 125 | 133 | 98 | 100 | |
| 2. Quality | | | | | |
| Color of fruit | Green green | Bright green | Dark green | Light | |
| Hardness of fruit | Adequate | Adequate | Hard | Soft | |
| 3. Condition of leaves | | | | | |
| Color | Green | Bright green | Dark green | Light green | |
| Sunscald | None | None | Seen | None | |
| Aging | None | None | Seen | None | |
| 4. Outbreak of diseases | | | | | Gray mold |
| Frequency of outbreak | Low | Low | Low | High | |
| Infectivity of diseases | Weak | Weak | Strong | Weak | |
| 5. Vermination of injurious insects | Small amount | None | Large | None | Greenhouse whitefly, aphid |

As is clear from Table 6, in the house covered with the film No. 1, cucumber grew hard; the aging of leaves (that is, the leaves showed sunscald and reduced luster, then became blackish, and finally withered) was earlier by about 15–20 days than in the houses covered with other films; the plant vigour was weak; the growth was slower; and the timing of harvesting was later than in other houses.

In the house covered with the film No. 4, the humidity was higher than in the houses covered with other films and was incessantly high. Partly owing to this fact, the plant vigour was strong; the plant was weak as a whole; the growth was active; and the yield of fruit was not large.

Presumably owing to the weakness of whole plant, the damage by diseases, particularly the damage by gray mold was large.

In contrast, in the houses covered with the film Nos. 2–3, cultivation was possible with substantially no extra labor required; the yield was large; the plant quality was good; and the profitability was very high.

In the houses covered with the film Nos. 1 and 4, there were newly employed the same fertilizer amount, watering amount, temperature control and sunlight control as in the second year of tomato cultivation. As a result, the yields increased to about the same level as in the house covered with the film No. 2.

[3] Example of cultivation of melon

Melon seeds (variety: Andes) were sown on January 15 to raise seedlings. On February 10, the seedling having 2 true leaves were set in each of the houses shown in Table 7, in a density of 1,500 plants/tan (991 m$^2$). Emerald sem was used as a stock and grafting was conducted by inarching.

Harvesting was conducted from May 20 through June 15. The results of cultivation are shown in Table 7.

The melons harvested in the houses covered with the film Nos. 2–3, as compared with those harvested in the houses covered with the film Nos. 1 and 4, gave higher yields and higher qualities, could be marketed as high-quality products, and gave higher profitabilities.

TABLE 7

| | Cultivation Example 7 | Cultivation Example 8 | Comparative Cultivation Example 7 | Comparative Cultivation Example 8 | Remarks |
| --- | --- | --- | --- | --- | --- |
| No. of spread film | 2 | 3 | 1 | 4 | |
| 1. Condition of leaves | | | | | |
| (1) Color | Green | Bright green | Dark green | Light green | |
| (2) Sunscald | None | None | Seen | None | |
| 2. Yield | 116 | 121 | 103 | 100 | |
| 3. Quality | | | | | |
| (1) Saccharose content | 13.9 | 14.1 | 13.3 | 13.5 | |
| (2) Condition of net | Good | Good | Good | Coarse | |
| 4. Outbreak of diseases | | | | | Gray mold |
| (1) Frequency of outbreak | Low | Low | Low | High | |
| (2) Infectivity of diseases | Weak | Weak | Strong | Weak | |
| 5. Vermination of injurious insects | Small amount | None | Large amount | None | Greenhouse whitefly, aphid |

[4] Example of cultivation of pimento

Pimento seeds (variety: Shin Sakigake No. 2) were sown on July 30 to raise seedlings. The seedlings were subjected to "kuntan" culture and set in each house on August 30 in a density of 3.7 plants/tsubo (3.3 m$^2$), and cultivation was continued. When the plant height became about 25 cm, four primary scaffold branches were erected and each connected to a plastic string hanged down from the top of the house. In this state, cultivation was further continued.

Harvesting was conducted from November 15 through May end, next year. The results of cultivation are shown in Table 8.

TABLE 8

|  | Cultivation Example 9 | Cultivation Example 10 | Comparative Cultivation Example 9 | Comparative Cultivation Example 10 | Remarks |
|---|---|---|---|---|---|
| No. of spread film | 2 | 3 | 1 | 4 | |
| 1. Yield | 123 | 135 | 110 | 100 | |
| 2. Vermination of injurious insects | Small amount | None | Large amount | None | Yellow thrip |

[5] Example of cultivation of watermelon

Watermelon seeds (variety: Shimao Max KE) were sown on December 25 to raise seedlings. On January 13, next year, the young seedlings were grafted to gourd (a stock) by cutting grafting. On February 10, the grafted seedlings were set in the balks (balk-to-balk distance: 2 m) of each of the houses shown in Table 9, in a density of 520 plants/tan (991 $m^2$), and cultivation was continued. Harvesting was conducted from April 25 through June mid. The results of cultivation are shown in Table 9.

TABLE 9

|  | Cultivation Example 11 | Cultivation Example 12 | Comparative Cultivation Example 11 | Comparative Cultivation Example 12 | Remarks |
|---|---|---|---|---|---|
| No. of spread film | 2 | 3 | 1 | 4 | |
| 1. Yield | 118 | 125 | 98 | 100 | |
| 2. Quality | | | | | |
| Saccharose content | 11.6 | 11.8 | 11.3 | 10.9 | |
| 3. Outbreak of diseases | | | | | Gray mold, sclerofal disease |
| (1) Frequency of outbreak | Low | Low | High | Low | |
| (2) Infectivity of diseases | Weak | Weak | Strong | Weak | |
| 4. Vermination of injurious insects | Small amount | Small amount | Large amount | Small amount | aphid |

[6] Examples of cultivation of celery and carrot

Celery seeds (variety: Cornel 619) were sown on December 1 to raise seedlings. On March 30, the seedlings were set in each of the houses shown in Table 10. Harvesting was conducted for 10 days starting from June 20. The results of cultivation are shown in Table 10.

On January 31, carrot seeds (variety: Kosei gosun) were sown in each of the houses shown in Table 11, to raise seedlings. On February 20, the seedlings of delayed growth were removed for thinning so as to give an intrarow spacing of 20 cm, and cultivation was continued. Harvesting was conducted from May 10 through May 15. The results of cultivation are shown in Table 11.

TABLE 10

|  | Cultivation Example 13 | Cultivation Example 14 | Comparative Cultivation Example 13 | Comparative Cultivation Example 14 | Remarks |
|---|---|---|---|---|---|
| No. of spread film | 2 | 3 | 1 | 4 | |
| 1. Yield | 118 | 122 | 81 | 100 | |
| 2. Quality | | | | | |
| (1) Color of whole plant | Green | Bright green | Excessively dark green | Light green | |
| (2) Hardness of whole plant | Adequate | Adequate | Too hard | Soft | |
| 3. Outbreak of diseases | | | | | Mainly sclerofal disease |
| (1) Frequency of outbreak | Low | None | High | High | |
| (2) Infectivity of diseases | Weak | — | Strong | Weak | |

TABLE 11

|  | Cultivation Example 15 | Comparative Cultivation Example 15 |
|---|---|---|
| No. of spread film | 3 | 4 |
| 1. Yield | 124 | 100 |
| 2. Quality | | |
| (1) Color | Bright crimson | Crimson |

[7] Example of cultivation of rose

On December 20, rose seedlings (variety: Curl Red) were set in the house (width: 20 m, depth: 50 m) covered with the film No. 1 so as to give an intrarow spacing of 40 cm, and cultivation was conducted with the in-house temperature being kept at 16° C. or higher. Harvesting was conducted from May 30 to November 30. The results of cultivation are shown in Table 12.

In Table 12, yield refers to an index when the total number of the roses harvested in the house covered with the film No. 4 was taken as 100.

TABLE 12

|  | Cultivation Example 16 | Cultivation Example 17 | Comparative Cultivation Example 16 | Comparative Cultivation Example 17 | Comparative Cultivation Example 18 |
|---|---|---|---|---|---|
| No. of spread film | 2 | 3 | 1 | 4 | 1 |
| 1. Sunscald of leaves | Slight | None | Much | A little | Slight |
| 2. Yield (number of harvested roses) | 128 | 134 | 92 | 100 | 115 |
| 3. Quality | | | | | |
| (1) Flower color (petal) | Crimson | Bright crimson | Blackened (striped) | Light color (faint color) | Slightly blackened |

TABLE 12-continued

|  | Cultivation Example 16 | Cultivation Example 17 | Comparative Cultivation Example 16 | Comparative Cultivation Example 17 | Comparative Cultivation Example 18 |
|---|---|---|---|---|---|
| 4. Outbreak of diseases (gray mold) |  |  |  |  |  |
| (1) Frequency of outbreak | None | None | Low | High | Low |
| (2) Infectivity of diseases | — | — | Strong | Weak | Strong |
| 5. Vermination of injurious insects (aphid) | Small amount | None | Large amount | Large amount | None |
| Frequent use of of cheese cloth | No | No | No | No | Yes |

As is clear from Table 12, the roses cultivated in the house covered with the film No. 1 generated a large number of black striped stains in the petals and were not marketable.

To prevent the above phenomenon, a black cheese cloth capable of intercepting 50% of sunlight was spread at the ceiling of the house whenever sunlight was intense, whereby no intense sunlight was allowed to directly hit the roses. As a result, the amount of the black stains generated was reduced to about ⅓. Meanwhile, when the cheese cloth was spread more frequently to decrease the amount of sunlight applied, the flower color of rose became light, causing a faint color phenomenon and giving lower quality.

In the house covered with the film No. 4, the flower color of rose became light and the roses harvested had a problem in commercial value. The high humidity in the house is presumed to have been one reason for the light flower color. It is presumed that, in a high humidity, the tree became soft and came to have reduced disease resistance and reduced injurious insect resistance. For prevention thereof, an agricultural chemical was spread, which gave stains owing to the agricultural chemical and an even lower commercial value.

In contrast, in the houses covered with the film Nos. 2–3, the flower color of rose was very bright crimson. Particularly, the roses cultivated in the house covered with the film No. 3 had a high commercial value.

As seen above, in the houses covered with the film Nos. 2–3, as compared with in the houses covered with the film Nos. 1 and 4, cultivation was very easy; there was no failure in cultivation by farmer and a stable yield was possible; moreover, high quality rose could be produced in a large amount; consequently, a high profit could be obtained.

[8] Examples of cultivation of prairie gentian and gerbera

Prairie gentian seeds (variety: Domino Pastel) were sown on July 20 to raise seedlings. On September 30, the young seedlings were set in each house, and cultivation was continued. Harvesting was conducted from January 15 through March 5.

The results of cultivation are shown in Table 13.

In Table 13, yield refers to an index when the total number of the prairie gentian harvested in the house covered with the film No. 4 was taken as 100.

TABLE 13

|  | Cultivation Example 18 | Cultivation Example 19 | Comparative Cultivation Example 19 | Comparative Cultivation Example 20 | Comparative Cultivation Example 21 |
|---|---|---|---|---|---|
| No. of spread film | 2 | 3 | 1 | 4 | 1 |
| 1. Yield (number of harvested plants) | 124 | 135 | 89 | 100 | 118 |
| 2. Quality |  |  |  |  |  |
| (1) Flower color | Crimson | Bright crimson | Blackened (striped) | Light color | Light crimson |
| Frequent use of cheese cloth | No | No | No | No | Yes |

As is clear from Table 13, in the house covered with the film No. 1, the prairie gentian generated a large number of black stains in the petals and could not be marketable.

For prevention thereof, the same cheese cloth as used in Comparative Cultivation Example 18 was used in the same manner as in Comparative Cultivation Example 18. As a result, frequent use of cheese cloth could diminish the black stains as in the flower of rose, but the flower color became light and the flower quality dropped.

In the house covered with the film No. 4, the flower color became light, posing a problem in commercial value.

In contrast, in the houses covered with the film Nos. 2 and 3, a large number of prairie gentian having a bright flower color could be harvested.

Results of cltivation similar to those of prairie gentian were obtained also in cultivation of gerbera (variety: Smoke World).

What is claimed is:

1. An agricultural covering material comprising a fluororesin film which intercepts a transmission of ultraviolet rays having a wavelength range of at least 300–330 nm, by at least 40% and which transmits at least 70% of visible rays having a wavelength range of 400–800 nm, wherein the fluororesin film comprises an inorganic fine powder capable of intercepting the transmission of the ultraviolet rays having the wavelength range of at least 300–330 nm.

2. An agricultural covering material according to claim 1, wherein the fluororesin film has, on at least one side thereof, a coating layer containing inorganic fine powder capable of intercepting the transmission of the ultraviolet rays having a wavelength range of at least 300–330 nm.

3. An agricultural covering material according to claim 1 or 2, wherein the inorganic fine powder is titanium oxide, zinc oxide or a mixture thereof.

4. An agricultural covering material according to claim 1, wherein the film contains 0.01–10% by weight of said inorganic fine powder.

5. An agricultural covering material according to claim 2, wherein the coating layer contains 0.5–95% by weight of said inorganic fine powder.

6. An agricultural covering material according to claim 1, wherein the fluororesin film is an ethylene/tetrafluoroethylene copolymer obtained by copolymerizing ethylene, tetrafluoroethylene and, as necessary, 10 mole % or less of a $C_4$–$C_{12}$ perfluoroalkylvinyl monomer, the molar ratio of ethylene and tetrafluoroethylene being in the range of 40/60 to 60/40.

7. A greenhouse covered with the agricultural covering material of claim 1.

8. A method for the cultivation of useful crops, which comprises cultivating said useful crops in a greenhouse covered with the agricultural covering material of claim 1.

9. An agricultural covering material comprising a fluororesin film which intercepts a transmission of ultraviolet rays having a wavelength range of at least 300–330 nm, by at least 40% and which transmits at least 70% of visible rays having a wavelength range of 400–800 nm, wherein the fluororesin film is 30–200 $\mu$m thick and comprises an ethylene/tetrafluoroethylene copolymer obtained by copolymerizing ethylene, tetrafluoroethylene and 0 to 10 mole % of a $C_4$–$C_{12}$ perfluoroalkylvinyl monomer, the molar ratio of ethylene and tetrafluoroethylene being in the range of 40/60 to 60/40 and an inorganic fine powder having a particle size of 20 to 500 nm capable of intercepting the transmission of the ultraviolet rays having the wavelength range of at least 300–330 nm.

10. An agricultural covering material according to claim 9, wherein the film contains 0.1 to 5% by weight of said inorganic fine powder.

11. An agricultural covering material according to claim 9, wherein the fluororesin film has, on at least one side thereof, a coating layer 2 to 50 $\mu$m thick containing 1 to 50% by weight of said inorganic fine powder capable of intercepting the transmission of the ultraviolet rays having a wavelength range of at least 300–330 nm.

12. An agricultural covering material according to claims 9, 10 or 11, wherein the inorganic fine powder is a member selected from the group consisting of titanium oxide, zinc oxide and mixtures thereof.

13. A greenhouse covered with the agricultural covering material of claim 9.

14. A method for the cultivation of useful crops, which comprises cultivating said useful crops in a green house covered with the agricultural covering material of claims 9, 10 or 11.

* * * * *